(12) United States Patent
Lee et al.

(10) Patent No.: US 8,089,190 B2
(45) Date of Patent: Jan. 3, 2012

(54) ROTOR FOR AN INTERIOR PERMANENT MAGNET SYNCHRONOUS MOTOR

(75) Inventors: Chang Ha Lee, Gyeonggi-do (KR); Jeong Hee Park, Gyeonggi-do (KR); Yong Sun Park, Gyeonggi-do (KR); Hyuck Roul Kwon, Gyeonggi-do (KR); Jung Pyo Hong, Seoul (KR); Sung Il Kim, Gyeongsangnam-do (KR); Tae Geun Lee, Seoul (KR)

(73) Assignees: Hyundai Motor Company, Seoul (KR); Indudstry-University Cooperation Foundation Hanyang University, Seoul (KR)

( * ) Notice: Subject to any disclaimer, the term of this patent is extended or adjusted under 35 U.S.C. 154(b) by 118 days.

(21) Appl. No.: 12/620,748

(22) Filed: Nov. 18, 2009

(65) Prior Publication Data
US 2011/0012464 A1    Jan. 20, 2011

(30) Foreign Application Priority Data
Jul. 14, 2009 (KR) .................. 10-2009-0063773

(51) Int. Cl.
*H02K 21/12* (2006.01)

(52) U.S. Cl. .................................. 310/156.53
(58) Field of Classification Search ............ 310/156.53, 310/156.14, 156.55, 156.56, 156.57, 156.54
See application file for complete search history.

(56) References Cited

U.S. PATENT DOCUMENTS

| | | | | |
|---|---|---|---|---|
| 4,559,463 A | * | 12/1985 | Kobayashi | 310/156.53 |
| 6,741,003 B2 | | 5/2004 | Naito et al. | |
| 7,221,071 B2 | * | 5/2007 | Fratta | 310/156.53 |
| 2003/0094875 A1 | * | 5/2003 | Sakuma et al. | 310/156.56 |
| 2004/0174084 A1 | * | 9/2004 | Tajima et al. | 310/156.53 |
| 2007/0152527 A1 | * | 7/2007 | Yura et al. | 310/156.53 |

FOREIGN PATENT DOCUMENTS

| | | |
|---|---|---|
| JP | 2002-191144 A | 7/2002 |
| JP | 2005-198487 A | 7/2005 |
| JP | 2008-283775 A | 11/2008 |
| KR | 10-2002-0061282 | 7/2002 |
| KR | 10-2008-0082779 | 9/2008 |

* cited by examiner

*Primary Examiner* — Nguyen N Hanh
(74) *Attorney, Agent, or Firm* — Edwards Wildman Palmer LLP; Peter F. Corless (57) ABSTRACT

The present invention provides a rotor for an interior permanent magnet synchronous motor for driving an air blower, in which the structure of the rotor is suitably modified to reduce magnetic flux leakage and, at the same time, maximize saliency ratio, thus improving the performance of the motor.

6 Claims, 7 Drawing Sheets

ROTOR FOR AN INTERIOR PERMANENT MAGNET SYNCHRONOUS MOTOR

CROSS-REFERENCE TO RELATED APPLICATION

This application claims under 35 U.S.C. §119(a) the benefit of Korean Patent Application No. 10-2009-0063773 filed Jul. 14, 2009, the entire contents of which are incorporated herein by reference.

BACKGROUND (a) Technical Field

The present disclosure relates, in general, to a rotor for an interior permanent magnet (IPM) synchronous motor. In particular preferred embodiments, it relates to a rotor for an interior permanent magnet (IPM) synchronous motor for driving an air blower, in which the structure of the rotor is suitably modified to reduce magnetic flux leakage and, at the same time, maximize saliency ratio, thus improving the performance of the motor.

(b) Background Art

Rotors of electric motors are generally classified into surface-mounted permanent magnet (SPM) rotors and interior permanent magnet (IPM) rotors according to the position of permanent magnets.

Figure 7:
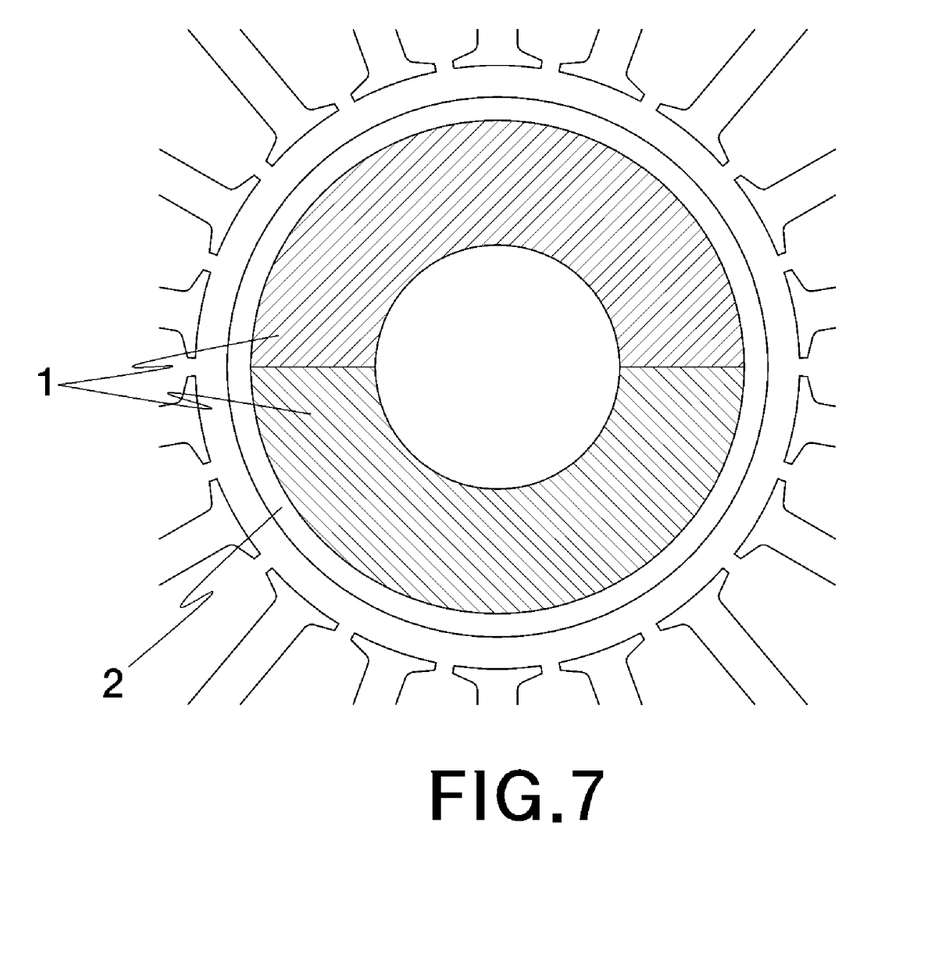
FIG. 7 is a schematic diagram showing an exemplary structure of a conventional surface-mounted permanent magnet (SPM) rotor.

Preferably, the SPM rotors are generally applied to most of high-speed motors (with a rotor shaft speed of more than 80 m/s) and, for example, as shown in FIG. 7, a retaining can 2 (or sleeve), which is a nonmagnetic material, is covered on the surface of permanent magnets 1 to prevent the permanent magnets from moving and ensure mechanical safety.

However, the high-speed motor in which the SPM rotor including the retaining can is applied causes an increase in the magnetic gap. Therefore, in order to satisfy the power required by the motor, the number of permanent magnets or coils used increases, or the size of the motor increases.

Accordingly, multi-layer IPM synchronous motors, in which permanent magnets are suitably inserted into the rotor in a multilayered manner, have been studied. However, such structures are rarely applied to the high-speed motors, and an important reason for this is that the space utilization for providing the IPM structure is reduced since the number of poles in the high-speed motors is limited to less than 4 poles. As a result, the magnetic flux leakage increases in a rotor core, and thus the efficiency of the motor decreases. Further, it is not easy to ensure sufficient mechanical strength against the stress exerted on the rotor core due to rotational force.

In certain examples where the multi-layer IPM rotor is applied to the high-speed motor, a space required to ensure mechanical safety, such as a rib, is increased, which reduces the space utilization and increases the magnetic flux leakage, thus making it suitably difficult to ensure the performance of the motor.

Figure 6:
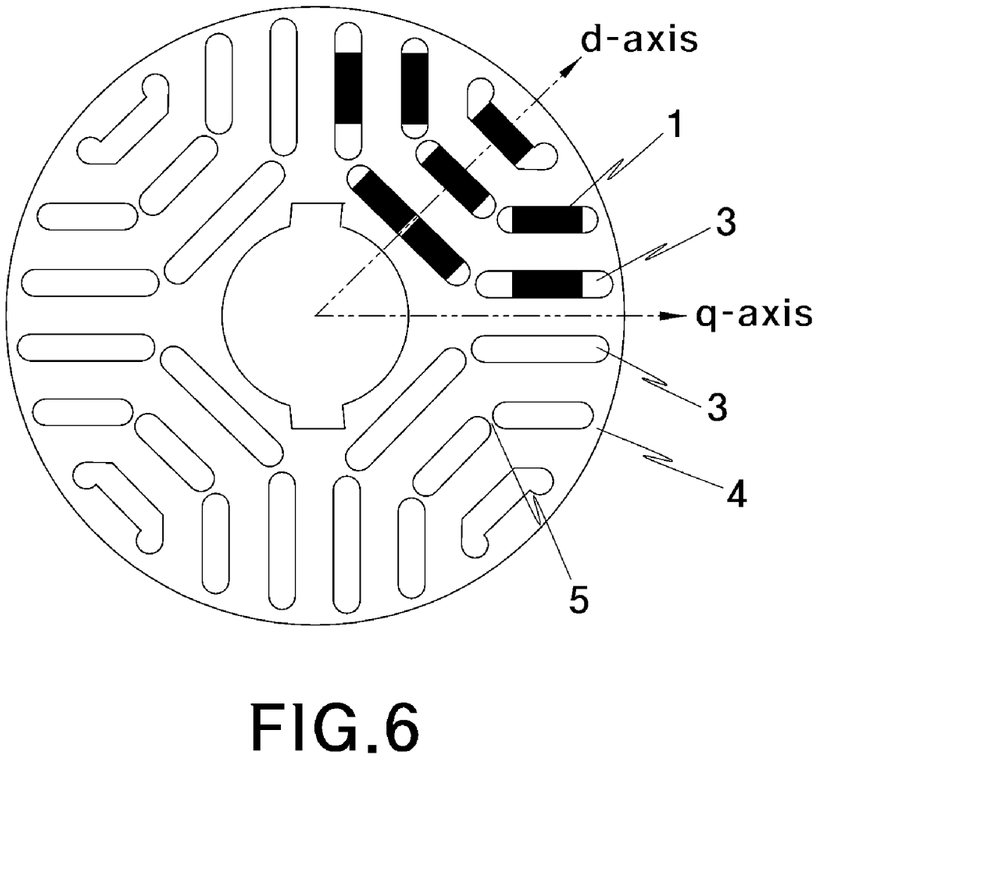
FIG. 6 is a schematic diagram showing an exemplary structure of a conventional 4-pole IPM rotor.

For example, as shown in FIG. 6, in a conventional 4-pole interior permanent magnet rotor, because the whole space of a flux barrier cannot be filled with a permanent magnet 1, there is a limitation in the space utilization. Moreover, in order to ensure mechanical safety during high-speed rotation, it is necessary to increase the distance between the respective flux barriers 1 and the distance between both ends of the flux barrier 3 and a rotor core 10, which corresponds to rib regions 4 and 5. Further, when the rib regions 4 and 5 are increased, the leakage of magnetic flux passing through the rib regions 4 and 5 increases, and thus it is difficult to ensure the performance of the motor.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

In one aspect, the present invention preferably provides a rotor for an interior permanent magnet (IPM) synchronous motor, in which permanent magnets are preferably inserted into a rotor core in the circumferential direction thereof in a multilayered manner to suitably minimize the force exerted on the rotor core, thus ensuring sufficient space in a limited area, which can be occupied by permanent magnets. In further preferred embodiments of the present invention, a flux barrier is suitably disposed between the permanent magnets arranged in the circumferential direction of the rotor core to suitably minimize magnetic flux leakage and suitably increase saliency ratio to an optimal level.

In a preferred embodiment, the present invention provides a rotor for an interior permanent magnet synchronous motor, the rotor preferably including: N-pole and S-pole permanent magnets suitably inserted into a rotor core in the circumferential direction thereof in a multilayered manner and arranged to face each other; and a flux barrier suitably formed in the rotor core between the N-pole and S-pole permanent magnets, wherein the multilayered N-pole and S-pole permanent magnets are suitably arranged around a central axis of the rotor core in the outer circumferential direction thereof at an obtuse angle.

In another preferred embodiment of the invention, the flux barrier may include first and second flux barriers, which are suitably bent toward the outer circumference of the rotor core from both ends of the innermost and middle permanent magnets among the multilayered N-pole and S-pole permanent magnets, and a third flux barrier which extends from an end of the outermost permanent magnet along the circumferential direction of the rotor core and is suitably adjacent to the second flux barrier.

In another preferred embodiment, an auxiliary flux barrier may be further provided between the outer ends of the first and second flux barriers and the outer end of the rotor core.

In still another preferred embodiment, a first rib which suitably divides the N-pole and S-pole permanent magnets into two equal parts and forms the same plane as the rotor core may be suitably formed in the central region of each of the N-pole and S-pole permanent magnets.

In yet another preferred embodiment, a second rib which forms the same plane as the rotor core may be further suitably formed between both ends of the N-pole and S-pole permanent magnets and the first to third flux barriers.

In still yet another preferred embodiment, a third rib which forms the same plane as the rotor core may be further suitably formed between the inner end of the auxiliary flux barrier and the outer ends of the second and third flux barriers and between the outer end of the auxiliary flux barrier and the outer end of the rotor core.

In a further preferred embodiment, a residual rotor core surface having a predetermined thickness may be suitably provided between the outermost permanent magnet among the N-pole and S-pole permanent magnets and the outer end of the rotor core to serve as a retaining can for protecting the N-pole and S-pole permanent magnets.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum).

As referred to herein, a hybrid vehicle is a vehicle that has two or more sources of power, for example both gasoline-powered and electric-powered.

The above features and advantages of the present invention will be apparent from or are set forth in more detail in the accompanying drawings, which are incorporated in and form a part of this specification, and the following Detailed Description, which together serve to explain by way of example the principles of the present invention.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Reference numerals set forth in the Drawings includes reference to the following elements as further discussed below:

| 10: | rotor core | 12: | N-pole permanent magnet |
| 14: | S-pole permanent magnet | 16: | residual rotor core surface |
| 20: | flux barrier | 21: | first flux barrier |
| 22: | second flux barrier | 23: | third flux barrier |
| 24: | auxiliary flux barrier | 31: | first rib |
| 32: | second rib | 33: | third rib |

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

In one aspect, the present invention features a rotor for an interior permanent magnet synchronous motor, the rotor comprising N-pole and S-pole permanent magnets; and a flux barrier, wherein the N-pole and S-pole permanent magnets are arranged around a central axis of the rotor core.

In one embodiment, the N-pole and S-pole permanent magnets are inserted into the rotor core in a circumferential direction.

In another embodiment, the magnets are inserted in a multilayered manner and arranged to face each other.

In another further embodiment, the flux barrier is formed in the rotor core between the N-pole and S-pole permanent magnets.

In still another embodiment, the N-pole and S-pole permanent magnets are arranged around a central axis of the rotor core in an outer circumferential direction.

In a related embodiment, the magnets are further arranged at an obtuse angle.

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Figure 1:
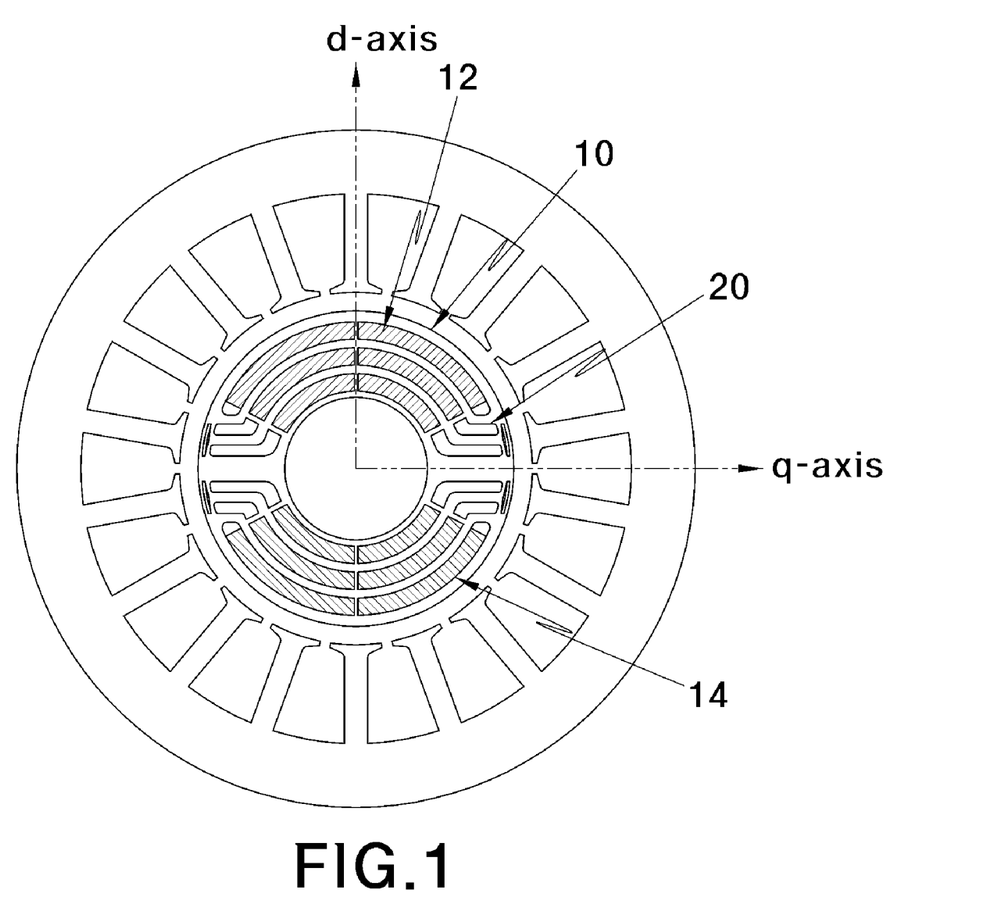
FIG. 1 is a cross-sectional view showing a structure of a rotor for an interior permanent magnet (IPM) synchronous motor in accordance with preferred embodiments of the present invention.
Figure 2:
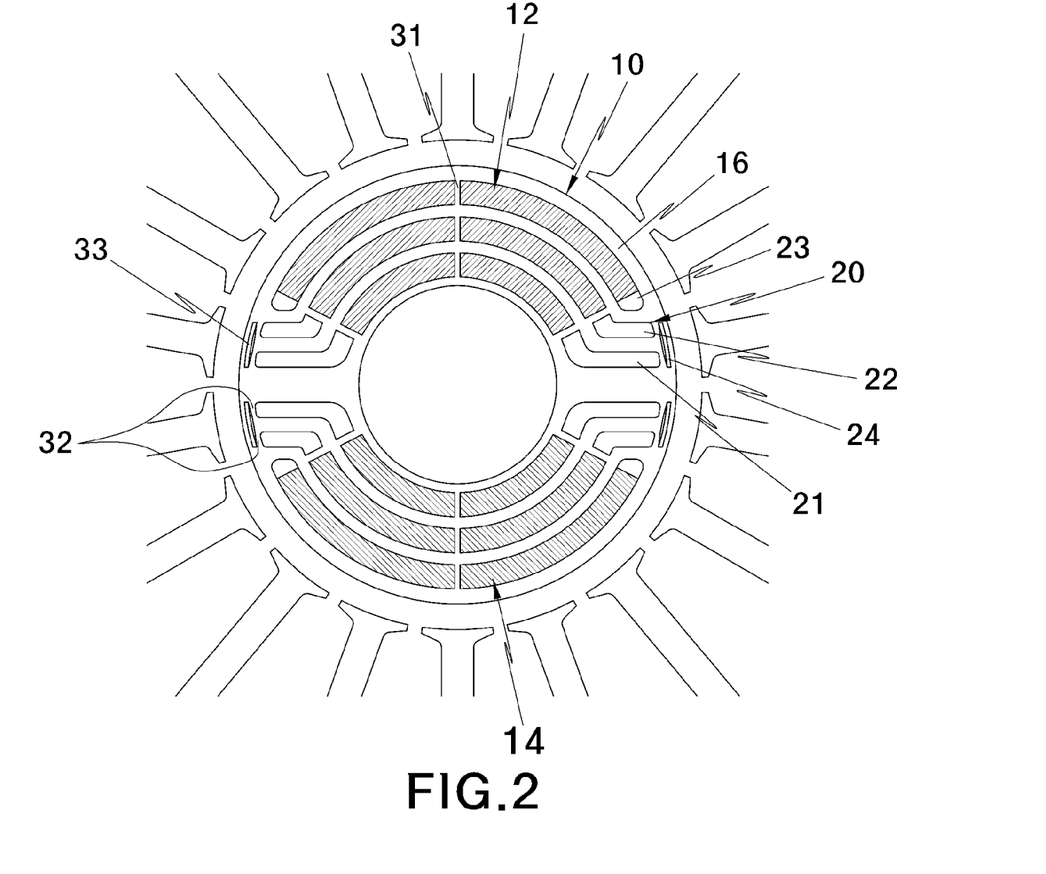
FIG. 2 is an enlarged view of FIG. 1.

FIG. 1 is a cross-sectional view showing a structure of a rotor for an interior permanent magnet (IPM) synchronous motor in accordance with preferred embodiments of the present invention, and FIG. 2 is an enlarged view of FIG. 1.

The present invention aims at providing an improved structure of a rotor for an interior permanent magnet (IPM) synchronous motor in which permanent magnets are suitably inserted into a rotor core of the IPM synchronous motor in the circumferential direction or the rotor core in a multilayered manner to reduce the stress exerted on the rotor core and, at the same time, rib regions are suitably minimized to reduce magnetic flux leakage, suitably increase space utilization, and suitably maximize the saliency ratio, thus improving the performance of the motor.

In further preferred embodiments, the present invention provides an improved structure in which the amount of permanent magnets used is minimized, the maximum stress suitably exerted on the rotor is reduced, and the structural safety is suitably ensured by appropriately arranging the permanent magnets and flux barriers in the rotor core, thus suitably maximizing the performance of the motor.

According to further preferred embodiments, for this purpose, as shown in FIGS. 1 and 2, N-pole and S-pole permanent magnets 12 and 14 are suitably inserted in a rotor core 10 in the circumferential direction thereof in a multilayered manner (more than three layers) and suitably arranged to face each other, and a flux barrier 20 is suitably formed on the surface of the rotor core 10 between the N-pole and S-pole permanent magnets 12 and 14.

Preferably, in more detail, the multilayered (more than three layers) N-pole and S-pole permanent magnets 12 and 14 are suitably arranged around a central axis of the rotor core 10 in the outer circumferential direction thereof at an obtuse angle and at regular intervals such that the force of the permanent magnets 12 and 14 is suitably uniformly dispersed on the entire surface of the rotor core 10, thus suitably reducing stress concentration.

Preferably, the flux barrier 20 may suitably include first to third flux barriers 21 to 23. The first and second flux barriers 21 and 22 are suitably bent toward the outer circumference of the rotor core 10 from both ends of the innermost and middle permanent magnets among the multilayered N-pole and S-pole permanent magnets 12 and 14. In further preferred embodiments, the third flux barrier 23 suitably extends from an end of the outermost permanent magnet along the circumferential direction of the rotor core 10 and is suitably adjacent to the second flux barrier 22.

Preferably, an auxiliary flux barrier 24 may be further provided between the outer ends of the first and second flux barriers 21 and 22 and the outer end of the rotor core 10 in the circumferential direction of the rotor core 10.

In further preferred embodiments, with the first to third flux barriers 21 to 23 suitably disposed in the rotor core 10, it is possible to suitably prevent the magnetic flux from leaking and, especially, the space in which the first to third flux barriers 21 to 23 is formed can be utilized as a space for installing permanent magnets, if necessary.

With the auxiliary flux barrier 24, it is possible to suitably disperse the stress concentration and suitably minimize the magnetic flux leakage.

Accordingly, since the flux barrier 20 limits q-axis magnetic flux and serves as a passage of d-axis magnetic flux, it suitably increases the saliency ratio and suitably reduces mechanical strength. However, according to the present invention, the flux barrier 20 is suitably divided into the first to third flux barriers 21 to 23 and the auxiliary flux barrier 24 and their arrangement is suitably optimized to prevent the saliency ratio from increasing to a critical level and maintain the mechanical strength at a constant level.

According to further preferred embodiments of the present invention, the central region of each of the N-pole and S-pole permanent magnets 12 and 14 is preferably divided into two equal parts in the radial direction, and the divided region serves as a first rib 31 which forms the same plane as the rotor core 10.

Accordingly, since the permanent magnets 12 and 14 arranged in the circumferential direction of the rotor core 10 are bisected by the first rib 31, it is possible to suitably disperse the maximum stress exerted on a permanent magnet formed as a single body.

According to further embodiments, preferably, a second rib 32 which forms the same plane as the rotor core 10 may be suitably disposed between both ends of the N-pole and S-pole permanent magnets 12 and 14 and the first to third flux barriers 21 to 23 such that both ends of the N-pole and S-pole permanent magnets 12 and 14 and the first to third flux barriers 21 to 23 are separated from each other.

In further embodiments of the invention, more preferably, a third rib 33 which forms the same plane as the rotor core 10 may be further suitably disposed between the inner end of the auxiliary flux barrier 24 and the outer ends of the second and third flux barriers 22 and 23 and between the outer end of the auxiliary flux barrier 24 and the outer end of the rotor core 10.

Further, it is reported that the thus formed first to third ribs 31 to 33 serve to suitably maintain the shape of the rotor and increase the saliency ratio by reducing the thickness thereof.

Accordingly, it is possible to suitably reduce the magnetic flux leakage and improve the saliency ratio by suitably reducing the thickness of the first to third ribs 31 to 33 formed in the rotor core 10 in accordance with the present invention, thus improving the performance of the motor.

In further preferred embodiments of the present invention, a residual rotor core surface 16 having a predetermined thickness may be suitably provided between the outermost permanent magnet among the N-pole and S-pole permanent magnets 12 and 14 and the outer end of the rotor core 10 to serve as a retaining can for protecting the N-pole and S-pole permanent magnets 12 and 14.

In certain exemplary embodiments, a test was performed using a predetermined program to suitably analyze the maximum stress, the amount of permanent magnets used, the flux linkage per phase, the saliency ratio, and the generated torque by modeling the arrangement of the N-pole and S-pole permanent magnets in the circumferential direction.

Figure 3:
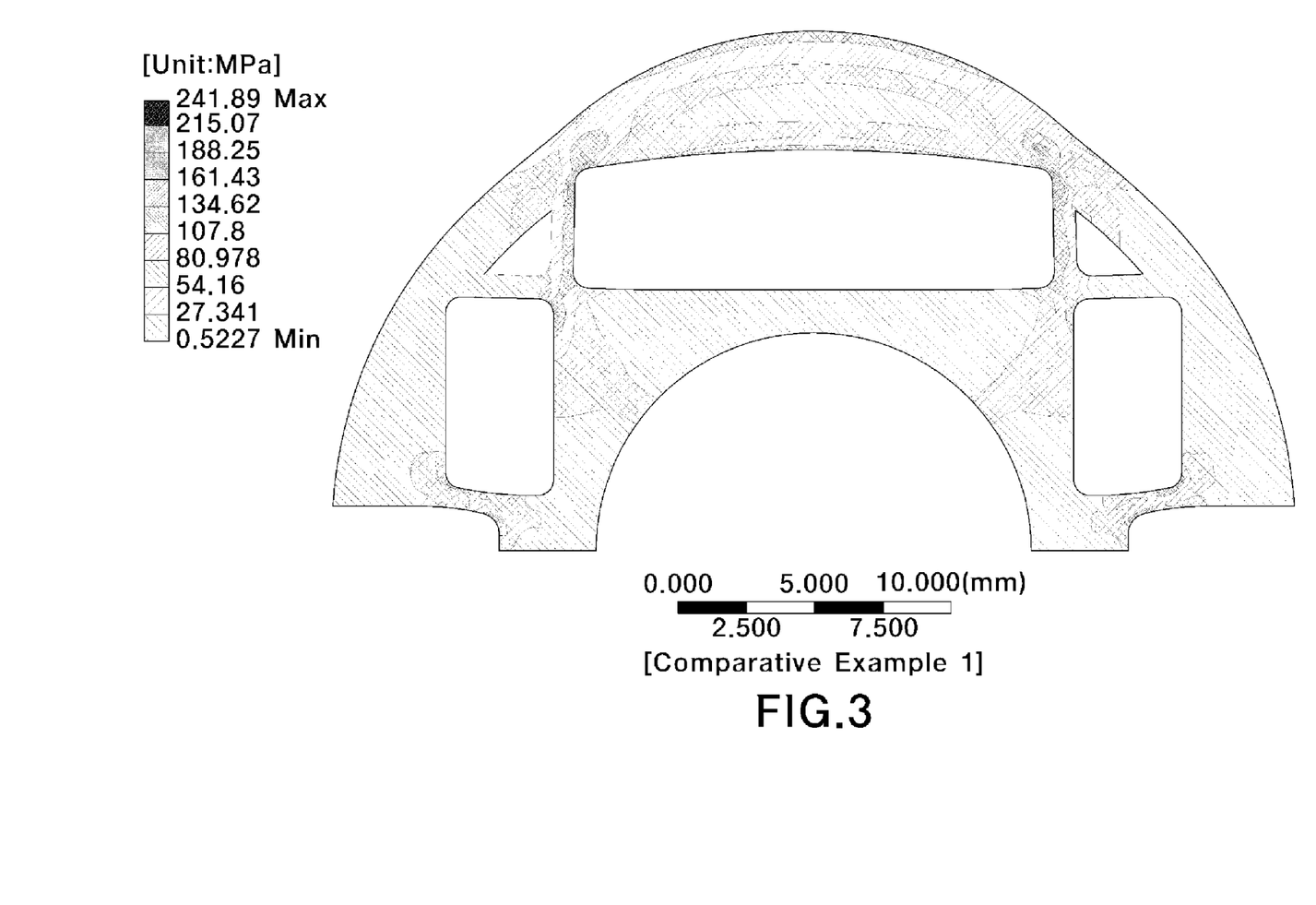
FIG. 3 is a schematic diagram showing an exemplary basic structure of an IPM rotor using rectangular permanent magnets in accordance with Comparative Example 1.
Figure 4:
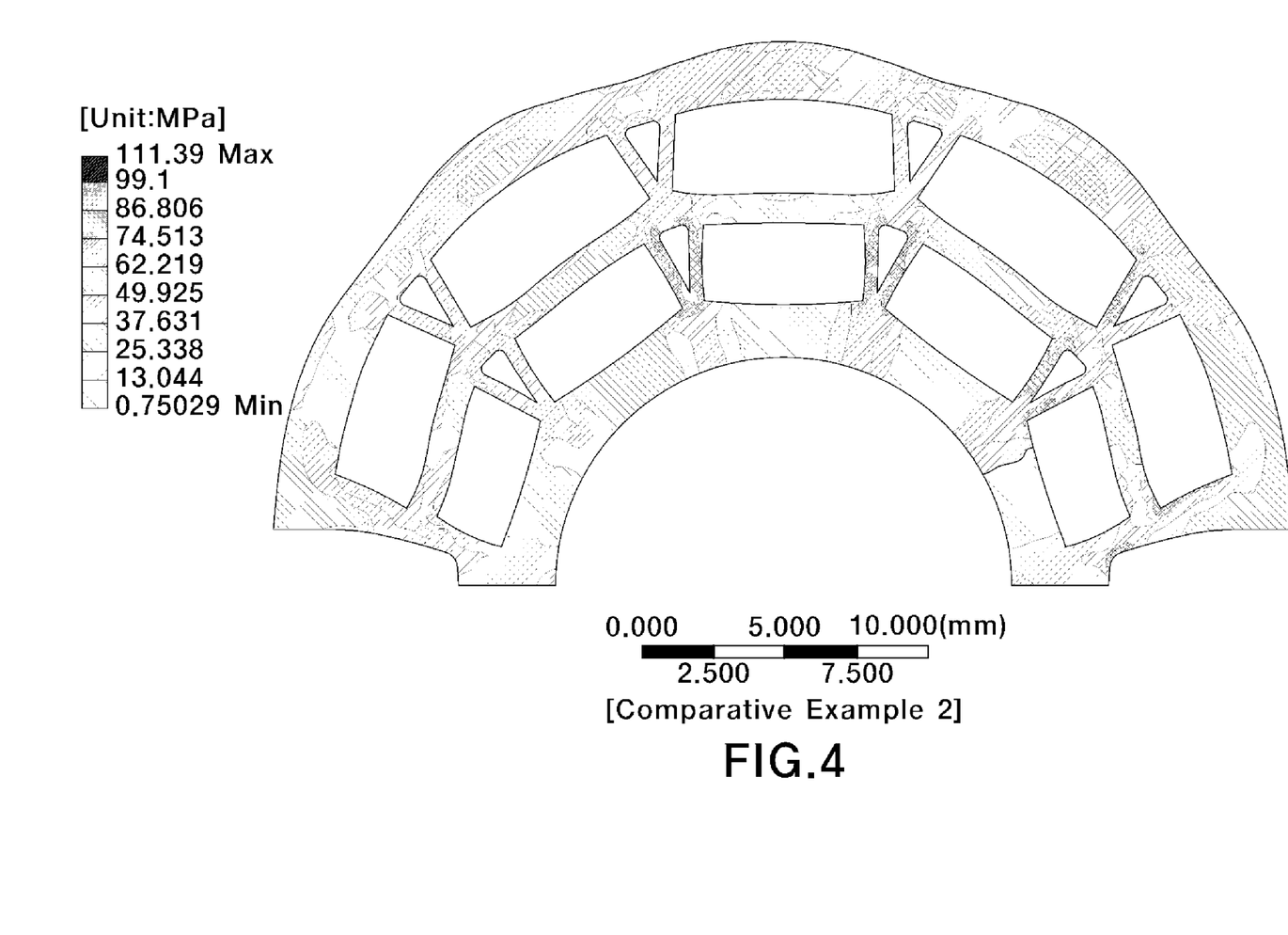
FIG. 4 is a schematic diagram showing an exemplary improved structure in which a permanent magnet is suitably divided into several pieces in accordance with Comparative Example 2.
Figure 5:
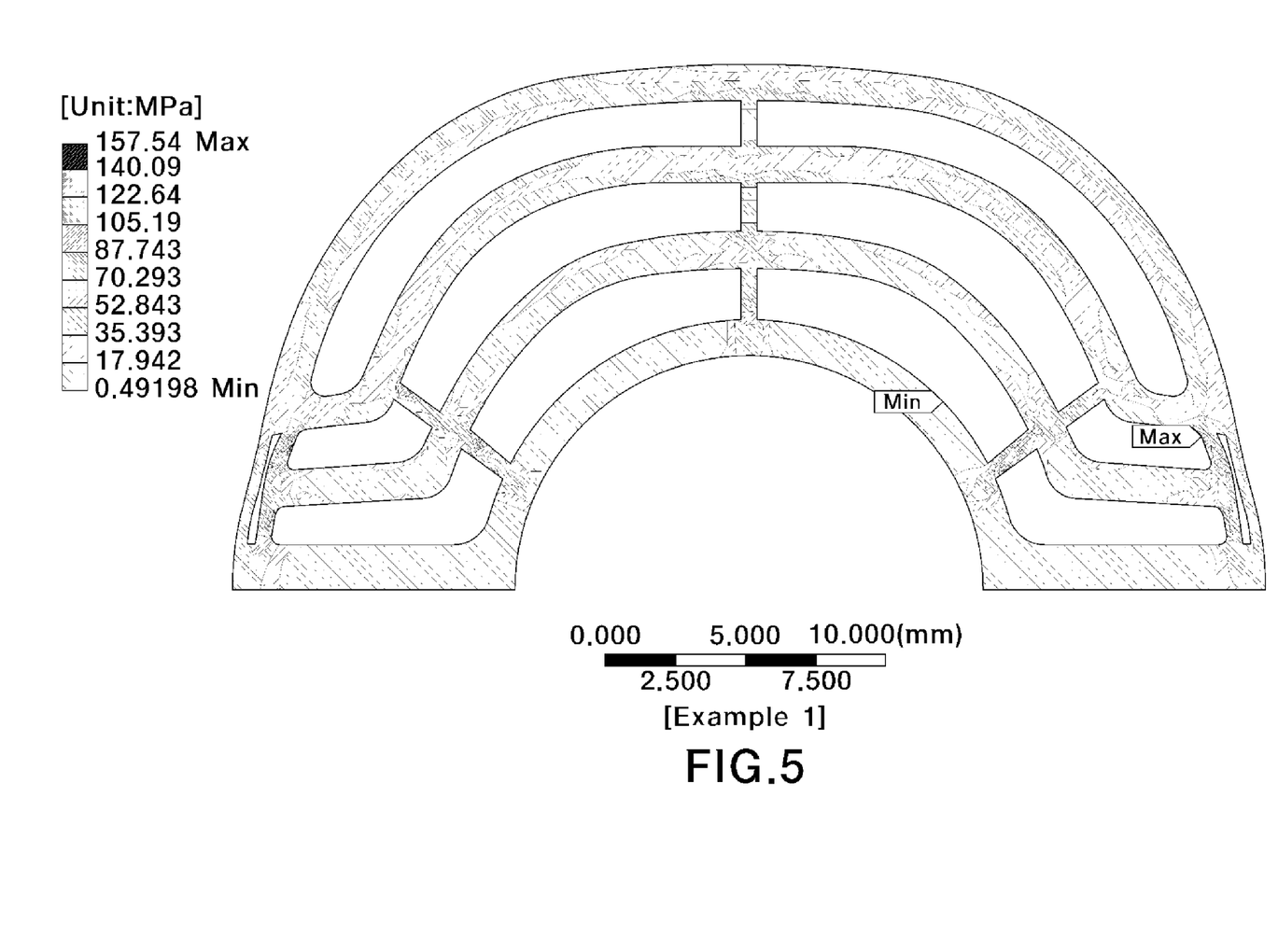
FIG. 5 is a schematic diagram showing an exemplary structure of permanent magnets of a rotor for an interior permanent magnet (IPM) synchronous motor in accordance with a preferred Example of the present invention.

According to preferred embodiments of the invention and as shown in FIG. 3, FIG. 3 is a schematic diagram showing an exemplary basic structure of an IPM rotor using rectangular permanent magnets in accordance with Comparative Example 1, According to other preferred embodiment, and as shown in FIG. 4, FIG. 4 is a schematic diagram showing an improved structure in which a permanent magnet is divided into several pieces in accordance with Comparative Example 2, and FIG. 5 is a schematic diagram showing an exemplary structure of permanent magnets of a rotor for an interior permanent magnet (IPM) synchronous motor in accordance with a preferred Example of the present invention.

The test results of the maximum stress, the amount of permanent magnets used, the flux linkage per phase, the saliency ratio, and the generated torque are shown in the following Table 1:

TABLE 1

| Analysis model | Maximum stress (MPa) | Amount of PMs used (mm$^2$) | Flux linkage per phase (Wb) | Saliency ratio (Lq/Ld) | Generated torque (Nm) |
|---|---|---|---|---|---|
| Comparative Example 1 | 241.9 | 126.6 | 0.0152 | 1.11 | 0.96 |
| Comparative Example 2 | 111.4 | 151.4 | 0.0156 | 1.42 | 0.15 |
| Example | 157.5 | 146.2 | 0.0186 | 2.17 | 1.96 |

As shown in Table 1, in Comparative Example 1, the flux linkage or torque was considerably low. In Comparative Example 2, the maximum stress could be considerably reduced by dividing the permanent magnet into several pieces, but the amount of permanent magnets used was suitably increased. Whereas, in the Example of the present invention, it was possible to suitably reduce the amount of permanent magnets used, suitably increase the flux linkage and the saliency ratio, and further improve the performance of the motor through an additional increase in torque.

As described above, the present invention provides, but is not limited to, the following effects.

According to the rotor for the IPM synchronous motor in accordance with preferred embodiments of the present invention, the permanent magnets are suitably inserted into the rotor core in the circumferential direction thereof in a multilayered manner to suitably minimize the force exerted on the rotor core, thus ensuring sufficient space in a limited area, which can be suitably occupied by the permanent magnets. In further preferred embodiments, the flux barriers are suitably disposed between the permanent magnets arranged in the circumferential direction of the rotor core to suitably minimize magnetic flux leakage, and, in further preferred embodiments, the plurality of ribs are also suitably disposed between the permanent magnets and between the flux barriers to suitably provide mechanical strength for maintaining the shape of the rotor.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A rotor for an interior permanent magnet synchronous motor, the rotor comprising:
    N-pole and S-pole permanent magnets inserted into a rotor core in the circumferential direction thereof in a multilayered manner and arranged to face each other; and
    a flux barrier formed in the rotor core between the N-pole and S-pole permanent magnets,
    wherein the multilayered N-pole and S-pole permanent magnets are arranged around a central axis of the rotor core in the outer circumferential direction thereof at an obtuse angle,
    wherein the flux barrier comprises first and second flux barriers, which are bent toward the outer circumference of the rotor core from both ends of the innermost and middle permanent magnets among the multilayered N-pole and S-pole permanent magnets, and a third flux barrier which extends from an end of the outermost permanent magnet along the circumferential direction of the rotor core and is adjacent to the second flux barrier.

2. The rotor for the interior permanent magnet synchronous motor of claim 1, wherein an auxiliary flux barrier is further provided between the outer ends of the first and second flux barriers and the outer end of the rotor core.

3. The rotor for the interior permanent magnet synchronous motor of claim 2, wherein a third rib which forms the same plane as the rotor core is further formed between the inner end of the auxiliary flux barrier and the outer ends of the second and third flux barriers and between the outer end of the auxiliary flux barrier and the outer end of the rotor core.

4. The rotor for the interior permanent magnet synchronous motor of claim 1, wherein a first rib which divides the N-pole and S-pole permanent magnets into two equal parts and forms the same plane as the rotor core is formed in the central region of each of the N-pole and S-pole permanent magnets.

5. The rotor for the interior permanent magnet synchronous motor of claim 1, wherein a second rib which forms the same plane as the rotor core is further formed between both ends of the N-pole and S-pole permanent magnets and the first to third flux barriers.

6. The rotor for the interior permanent magnet synchronous motor of claim 1, wherein a residual rotor core surface having a predetermined thickness is provided between the outermost permanent magnet among the N-pole and S-pole permanent magnets and the outer end of the rotor core to serve as a retaining can for protecting the N-pole and S-pole permanent magnets.

* * * * *